US011103896B2

(12) United States Patent
Grupp et al.

(10) Patent No.: US 11,103,896 B2
(45) Date of Patent: Aug. 31, 2021

(54) PARCEL SORTING SYSTEM AND METHOD

(71) Applicant: Siemens Logistics LLC, DFW Airport, TX (US)

(72) Inventors: Francisco Grupp, Trophy Club, TX (US); Michael D. Carpenter, Arlington, TX (US)

(73) Assignee: Siemens Logistics LLC, New York, NY (US)

( * ) Notice: Subject to any disclaimer, the term of this patent is extended or adjusted under 35 U.S.C. 154(b) by 0 days.

(21) Appl. No.: 16/789,009

(22) Filed: Feb. 12, 2020

(65) Prior Publication Data

US 2021/0008597 A1 Jan. 14, 2021

Related U.S. Application Data

(63) Continuation-in-part of application No. 16/504,381, filed on Jul. 8, 2019.

(51) Int. Cl.
*B07C 3/00* (2006.01)
*B07C 3/04* (2006.01)
*G06Q 50/28* (2012.01)

(52) U.S. Cl.
CPC .............. *B07C 3/006* (2013.01); *B07C 3/04* (2013.01); *G06Q 50/28* (2013.01)

(58) Field of Classification Search
CPC ........ B65G 47/48; B65G 47/904; B07C 3/08; B07C 3/18; B07C 3/008; B65D 71/0096
See application file for complete search history.

(56) References Cited

U.S. PATENT DOCUMENTS

| 3,033,366 | A | * | 5/1962 | Atanasoff | ................ B07C 3/08 209/562 |
| 6,201,203 | B1 | * | 3/2001 | Tilles | ..................... B07C 3/008 209/540 |
| 6,610,954 | B2 | | 8/2003 | Takizawa | |
| 7,138,596 | B2 | | 11/2006 | Pippin et al. | |

(Continued)

FOREIGN PATENT DOCUMENTS

| CN | 205851401 U | 1/2017 |
| CN | 206028159 U | 3/2017 |

(Continued)

OTHER PUBLICATIONS

Francisco Grupp, et al., "Parcel and Pallet Sorting System and Method", U.S. Appl. No. 16/504,381, filed Jul. 8, 2019, pp. 25.

*Primary Examiner* — Charles A Fox
*Assistant Examiner* — Jessica L Burkman

(57) ABSTRACT

A parcel sorter system and method. A process performed by a parcel sorter system includes receiving sorting information of a first parcel. The process includes identifying a first destination pallet corresponding to the sorting information. The first destination pallet is associated with a first carousel and a first destination chute. The process includes transporting the first parcel toward the first destination chute. The process includes, while transporting the parcel toward the first destination chute, operating the first carousel to move the first destination pallet proximate to the first destination chute. The process includes delivering the first parcel at the first destination chute for placement on the first destination pallet.

14 Claims, 8 Drawing Sheets

(56) References Cited

U.S. PATENT DOCUMENTS

| | | | | |
|---|---|---|---|---|
| 8,005,568 B2* | 8/2011 | Hamilton | ............ | G06Q 10/0833 |
| | | | | 700/225 |
| 2003/0194307 A1* | 10/2003 | Ward | ................. | B65G 17/24 |
| | | | | 414/794.7 |
| 2008/0099381 A1* | 5/2008 | Culp | ..................... | B07C 5/34 |
| | | | | 209/577 |

FOREIGN PATENT DOCUMENTS

| | | | |
|---|---|---|---|
| CN | 206606702 U | 11/2017 |
| DE | 3236471 A1 | 4/1984 |
| JP | H09216722 A | 8/1997 |
| JP | 2003118842 A | 4/2003 |

* cited by examiner

PARCEL SORTING SYSTEM AND METHOD

CROSS-REFERENCE TO RELATED APPLICATIONS

This application is a continuation-in-part of U.S. patent application Ser. No. 16/504,381, filed Jul. 8, 2019, which is hereby incorporated by reference.

TECHNICAL FIELD

The present disclosure is directed, in general, to parcel processing techniques.

BACKGROUND OF THE DISCLOSURE

To efficiently transport parcels, the parcels are often sorted and loaded onto pallets. Improved and more efficient systems for sorting, processing, and palletizing parcels, and for processing the parcel pallets, are desirable.

SUMMARY OF THE DISCLOSURE

Various disclosed embodiments include a process performed by a parcel sorter system includes receiving sorting information of a first parcel. The process includes identifying a first destination pallet corresponding to the sorting information. The first destination pallet is associated with a first pallet carousel and a first destination chute. The process includes transporting the first parcel toward the first destination chute. The process includes, while transporting the parcel toward the first destination chute, operating the first pallet carousel to move the first destination pallet proximate to the first destination chute. The process includes delivering the first parcel at the first destination chute for placement on the first destination pallet.

Another disclosed embodiment includes a parcel sorter system, comprising a control system, a parcel sorter under control of the control system, a plurality of destination chutes configured to receive parcels from the parcel sorter, and a plurality of pallet carousels under control of the control system, each pallet carousel transporting a plurality of pallets. The control system is configured to perform processes as described herein.

Various embodiments include moving the first parcel from the first destination chute to the first destination pallet. In various embodiments, the parcel sorter system moves the first parcel from the first destination chute to the first destination pallet using a palletizing robot. Various embodiments include operating the first pallet carousel to move the first destination pallet into position to be removed from the first pallet carousel. Various embodiments include controlling a pallet transport and management system to remove and replace the first destination pallet. In various embodiments, the pallet transport and management system shrink-wraps the first destination pallet. In various embodiments, receiving sorting information of the first parcel includes using a reader to detect indicia on the first parcel and performing an optical character recognition process on the indicia. In various embodiments, receiving sorting information of the first parcel includes using a reader to detect indicia on the first parcel and performing a barcode recognition process on the indicia. In various embodiments, the first parcel is delivered to the first destination chute at the same time as or after the first destination pallet arrives proximate to the first destination chute. Various embodiments include determining that the first destination pallet is filled.

Various embodiments also include parcel sorter system having a control system, a parcel sorter under control of the control system, a plurality of destination chutes configured to receive parcels from the parcel sorter; and a plurality of carousels under control of the control system, each carousel transporting a plurality of modular transportable storage units, each storage unit having a plurality of bins. The control system is configured to receive sorting information of a first parcel. The control system is configured to identify a first destination bin of the plurality of destination bins, on a first storage unit being transported by the first carousel, corresponding to the sorting information. The first destination bin is associated with the first carousel of the plurality of carousels and a first destination chute of the plurality of destination chutes. The control system is configured to transport the first parcel toward the first destination chute on the parcel sorter. The control system is configured to, while transporting the parcel toward the first destination chute, operate the first carousel to move the first destination bin proximate to the first destination chute. The control system is configured to deliver the first parcel at the first destination chute for placement in the first destination bin. In various embodiments, the control system is further configured to move the first parcel from the first destination chute to the first destination bin. In various embodiments, the control system is further configured to operate the first carousel to move the first storage unit into position to be removed from the first carousel. In various embodiments, the control system is further configured to control a storage unit transport and management system to remove and replace the first storage unit. In various embodiments, the first parcel is delivered to the first destination chute at the same time as or after the first destination bin arrives proximate to the first destination chute. In various embodiments, the first storage unit comprises an identification device with a machine-readable identifier that identifies the first storage unit and is usable by the control system to track the first storage unit and parcels associated with the first storage unit. In various embodiments, the first storage unit comprises an identification device with a machine-readable identifier that identifies the first storage unit and is usable to verify that the first storage unit has been mounted into a delivery vehicle. In various embodiments, the first storage unit comprises an identification device with a machine-readable identifier that identifies the first storage unit and is implemented using a machine-readable bar code, a radio-frequency identification (RFID) tag, or a Bluetooth-readable tag. In various embodiments, the first storage unit comprises an identification device with a machine-readable identifier that identifies the first storage unit and is implemented using security features usable for ensuring that the first storage unit is authentic and authorized. In various embodiments, the first storage unit is configured to be mounted directly into a delivery vehicle when loaded with parcels for delivery.

Various embodiments also include a parcel sorter system having a control system, a parcel sorter under control of the control system, a plurality of destination chutes configured to receive parcels from the parcel sorter, and a plurality of carousels under control of the control system, each carousel transporting a plurality of destination containers. The control system is configured to receive sorting information of a first parcel and identify a first destination container being transported by the first carousel, corresponding to the sorting information. The first destination container is associated with the first carousel of the plurality of carousels and a first destination chute of the plurality of destination chutes. The control system is configured to transport the first parcel toward the first destination chute on the parcel sorter, and, while transporting the parcel toward the first destination chute, operate the first carousel to move the first destination container proximate to the first destination chute. The control system is configured to cause the first parcel to be delivered at the first destination chute for placement in the first destination container. The destination container can be, for example, a sack, bin, box, shelf, bucket, or any other container in various embodiments.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
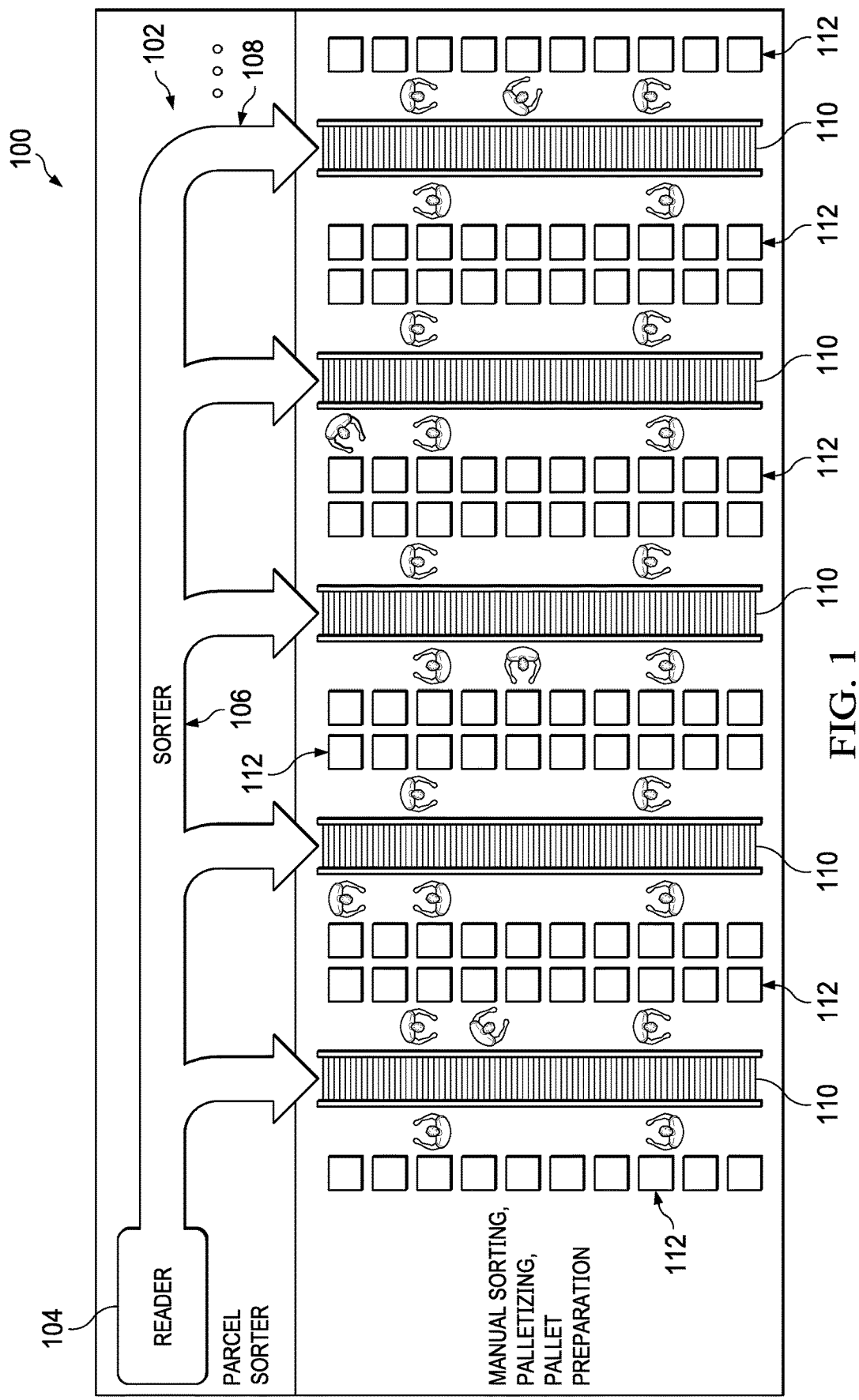
FIG. 1 illustrates an example of a sorting system.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Postal agencies have introduced "Work Sharing" programs whereby customers introduce batches of items to be delivered deeply into the postal distribution network, meaning that these items are presented to the postal agencies at a point nearer the ultimate delivery destination of the parcels, so that the postal agency avoids some of the initial sorting and transportation of the items. By doing so, the processing costs of the postal agency can be greatly reduced, and a portion of this savings can be passed along to the originator in the form of discounts on the delivery fee. The deepest discounts are offered in cases in which the items to be delivered are injected at the final processing step, very near the destination. While this approach has been common for many years in the processing and delivery of mail such as letters or flats (magazine-sized items), only recently has this approach become a major factor in the delivery of goods (parcels) by postal agencies.

To realize savings, items meeting a threshold of quantity as well as meeting the preparation and processing standards of the Postal Agency are delivered to post offices that serve local communities. From the standpoint of processing and preparation, a sorting operation is relatively unusual in that a relatively high number of sorting breaks that are required, which exceeds the largest configurations of parcel sorter. Indeed, operations of this type typically employ a hierarchical sorting process, in which the initial sort is often automated, and the sorted output of the initial automated sorting process are sorted again manually. The hierarchical structure of sorting elements is analogous to particular fields in the postal codes associated with the delivery addresses of the parcels. For example, sorting first to a region (the most significant digits of a postal code), and then among the neighborhoods within that region (less significant digits).

In other cases, parcel delivery services, such as UPS or FedEx, typically begin their individual delivery routes early in the morning, and delivery vehicles must be preloaded in preparation of beginning the route. During preload, parcels are arranged according to the efficient execution of deliveries on the route. During preload, individual items are manually loaded into specific locations on a truck, such that individual package locations support efficiency in the sequence of delivery.

Disclosed embodiments can efficiently palletize parcels for bundle delivery to a destination and can alternately load transportable units for direct mounting in delivery vehicles. A process for sorting and palletizing parcels is addressed first.

FIG. 1 illustrates one method of conducting this process in a sorting system 100. In this example, sorting system 100 includes a parcel sorter 102 which itself includes a parcel reader 104, sorter mechanism 106, and chutes 108. In such a system, long gravity conveyors 110 receive sorted parcels off of each chute 108 in the first (often automatic) sorting process. Labelled pallets 112 are juxtaposed along each gravity conveyor 110, and a human operator removes the parcel from the gravity conveyor 110 in the vicinity of the pallet 112 to which it is destined, and places it on the pallet 112. In this approach, the operator spends a great deal of time walking from pallet to pallet, which effectively establishes a relatively low sorting productivity.

In such a process, when individual pallets reach their capacity, they must be shrink-wrapped, labeled, removed, and replaced with an empty pallet. Like manual sorting, these activities involve a significant amount of walking from place to place, which translates into low productivity.

The output of this two-step sorting for standard-sized parcels is typically pallets of parcels destined to the same area. When the manual second-step of the sorting process has created a full pallet, the pallet is shrink-wrapped, labelled in accordance with postal agency requirements, and transported to the designated postal facility, to be injected into the postal agency process at a point commensurate with the degree of preparation and sortation. Since most of the processing is done manually, significant cost is involved in the operation.

Figure 2:
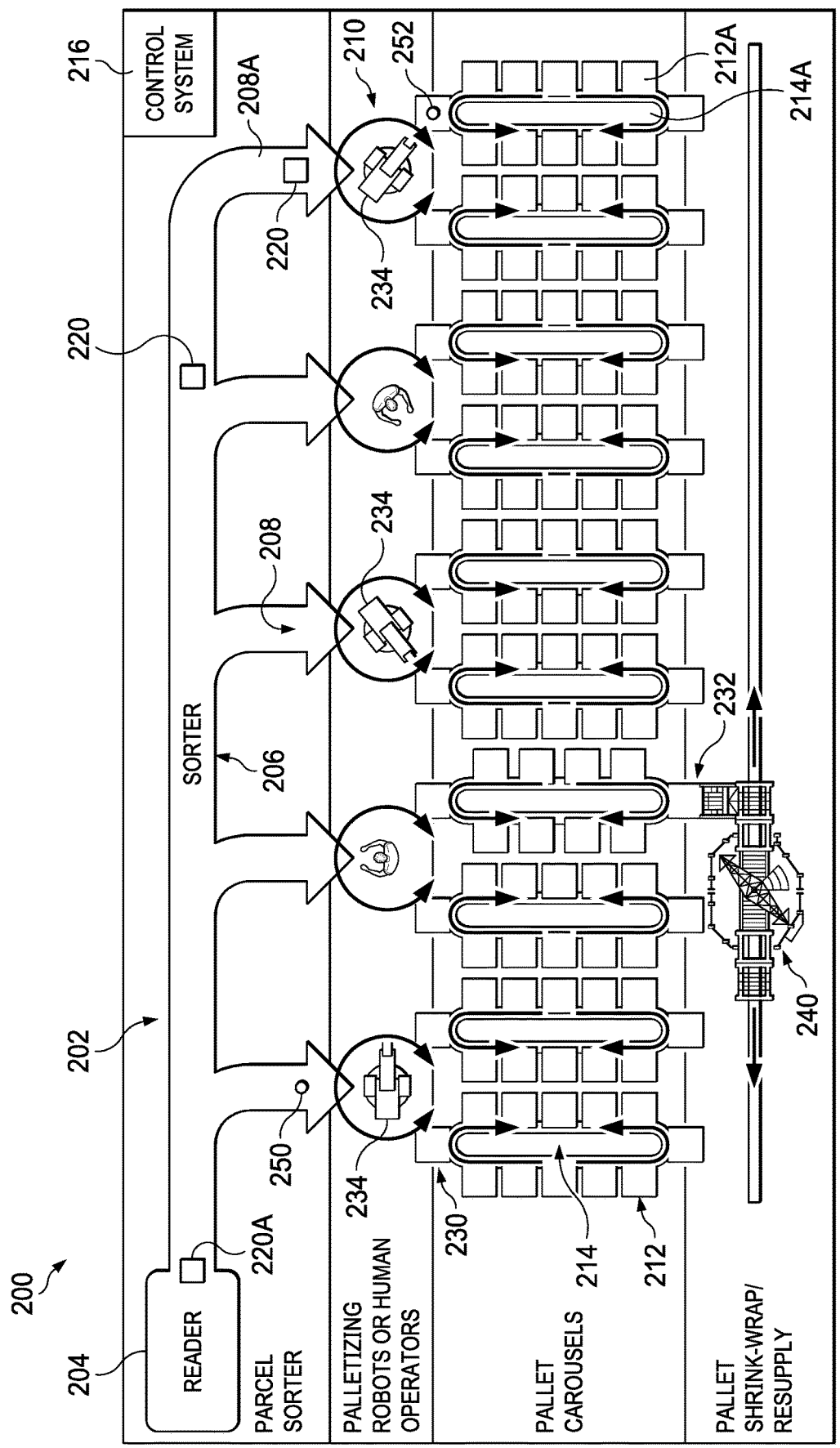
FIG. 2 illustrates an example of a sorting system in accordance with disclosed embodiments.

FIG. 2 illustrates an example of a sorting system 200 in accordance with disclosed embodiments, which improves on a system as illustrated in FIG. 1. A sorting system 200 as disclosed herein radically improves the productivity of the second step in sorting and in the preparation of pallets for shipment. Sorting system 200 and its various elements described herein operated under the control of a control system 216, which can be a standalone control system, a control system that also controls other devices or systems, a combination of interconnected control systems that are integrated with one or more of the components described here, or otherwise. Control system 216 is configured to control the various elements of sorting system 200 to perform actions as described herein.

Figure 5:
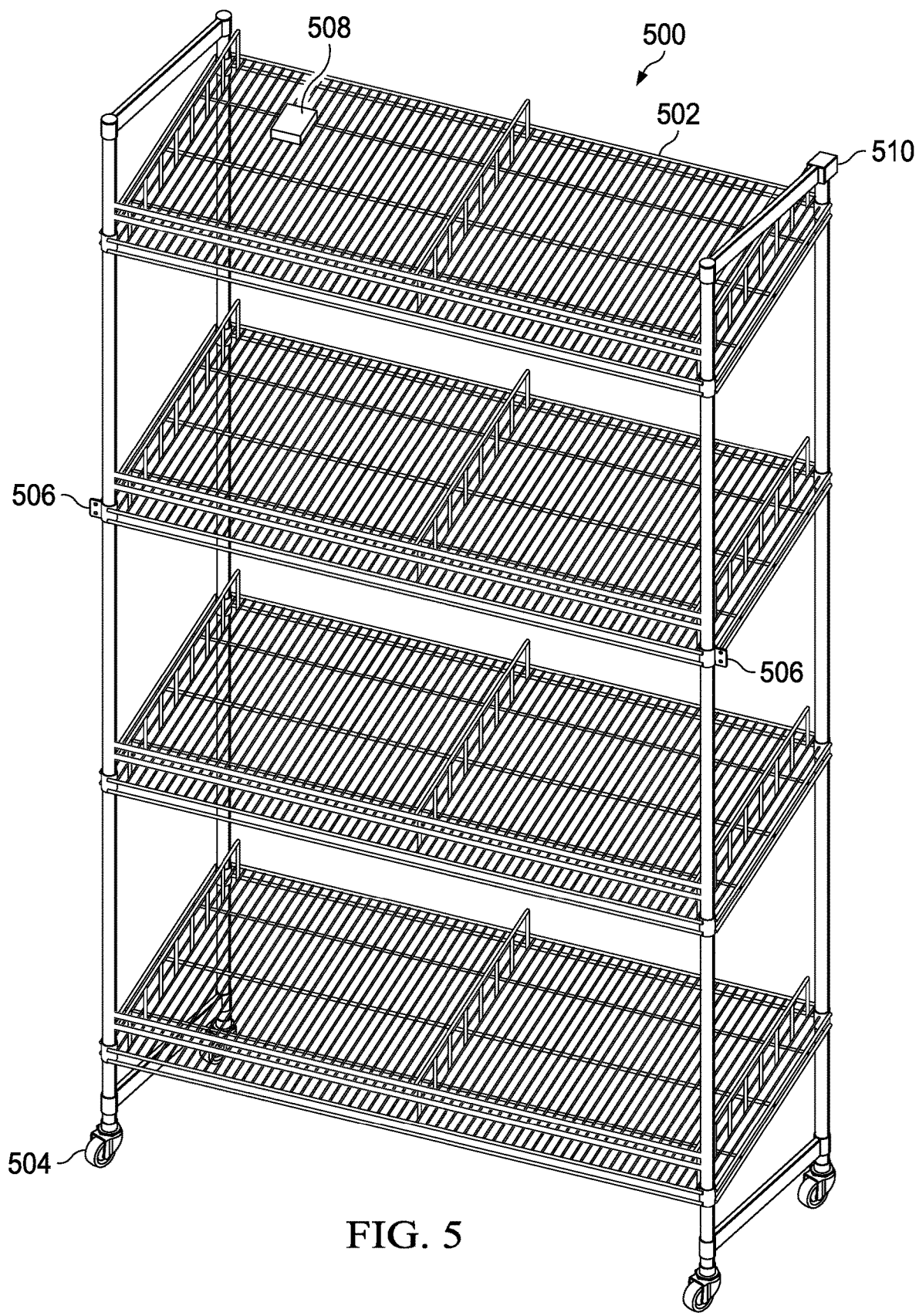
FIG. 5 illustrates an example of a modular transportable storage unit in accordance with disclosed embodiments.

In the example of FIG. 2, the sorting system 200 includes a parcel sorter 202 which itself includes a parcel reader 204, sorter mechanism 206, and destination chutes 208 (which may also be referred to herein as destination "buckets"). Parcel reader 204 determines the destination of parcels 220 on sorter mechanism 206. In the example of FIG. 5, five chutes 208 are shown on the parcel sorter 202, for simplicity of illustration, though an actual implementation may have more or even many more chutes 208. Proximate to the output of each chute 208 is one or more parcel carousels 214, each carrying a plurality of pallets 212. In this non-limiting example, there are two carousels 214 proximate to the output of each chute 208, and there are ten pallets carried by each carousel 214. At 210, human operators, palletizing robots 234, or another transport mechanism transport individual parcels 220 from each destination chute 208 onto a specific pallet 212 on a carousel 214.

The sorting-destination result from the reader 204 for each parcel 220 is known well before the parcel 220 reaches its destination chute 208 on the sorter mechanism 206. In the hierarchy of sorting illustrated in FIG. 2, the ultimate number of sorting destinations is represented by the number of pallets 212 in all of the carousels 214. In this example, each carousel 214 holds ten pallets 212, each representing a sorting destination. There are ten carousels 214, therefore the total number of buckets (sorting destinations) is 100.

In this example, each carousel 214 includes at least two access portals. A parcel access portal 230 is configured so that parcels 220 may be placed (or removed) onto individual pallets 212 on the carousel 214, whether by an operator or by automation by the sorting system 200 itself using a robot, conveyor system, or otherwise. A pallet access portal 232 is configured so that individual pallets 212 can be inserted and extracted from the carousel 214. In the example of FIG. 2, parcel access portal 230 is located at the end of each carousel 214 nearest to the respective destination chute 208, while pallet access portal 232 is located at the end of each carousel 214 furthest from the respective destination chute 208.

In various embodiments, a pallet transport and management system 240 is configured to travel between the multiple pallet access portals 232, and is configured to manage the pallets 212, performing such tasks as removing filled pallets 212 from the carousel 214, shrink-wrapping or otherwise preparing filled pallets 212 for transport, transporting filled pallets 212 to further processing stages, transporting empty pallets 212 to the carousels 214, and placing empty pallets 212 into the carousel 214.

The capacity of each carousel 214 depends on the individual design. Indeed, since the maximum carousel index time is ideally less than the latency time between the reader 204 and the destination chute 208, it may advantageous to implement shorter carousels or carousels with fewer sorting destinations at the chutes 208 nearer to the reader 204. As shown above, carousels are bidirectional; the direction providing shortest index time between the current position and the next position is preferably selected.

For each of the parcels that have passed the reader 204 (apart from unreadable parcels), the particular pallet sorting destination is determined and known by the control system 216 so that actions can be taken across the entire sorting system 200. This allows the allows the control system 216 to begin moving ("indexing") the carousels 214 containing the destination pallet 212 for each parcel 220 to the correct position prior to the parcel being sorted. This feature increases the sorting productivity, particularly but not limited to when human operators are used, by reducing or eliminating any "waiting time" between when a sorted parcel is delivered from chute 208 and when the sorting destination pallet 212 is moved to the parcel access portal 230 (or otherwise in position to receive the parcel 220). Since the distance from the reader 204 to the destination chute 208 translates to the amount of carousel indexing head-start, the highest density destinations may be shifted to the longer-distance chutes. In some cases, the system can assign a destination layout so that the shortest distance between the reader and any chute provides adequate latency for the longest carousel indexing time. Alternatively, in a tradeoff with the overall size of the system, adequate latency for pre-indexing can be ensured by designing the system with a prescribed distance between the reader and the closest destination chute.

In different embodiments, depending on various factors, including the physical characteristics of the parcels being processed, it may be advantageous to utilize either robots or human operators to perform the sorting and palletizing function, as illustrated at 210. In the illustration above, the operator or robot is responsible for placing sorted items onto one of two pallets, depending on various factors of performance and layout, this relationship could be one to four, one to six, or more. It may be advantageous to distribute items to be placed either by robot or operator based on the physical characteristics of the individual items. For instance, items whose physical characteristics would not be optimal for robotic placement, such as unwieldy or irregularly-shaped items. Further, as illustrated, any particular position for given parcel carousels can be assigned to a human operator, palletizing robot 234, or another transport mechanism, and so there may be a combination of these in any particular implementation.

Various embodiments can include specific design elements that reduce or prevent mis-sorting. For example, each chute 208 can be implemented with a "chevron" orientation of rollers on a gravity conveyor maintain the sequence of the items sorted to that chute and a single-file sequence of items.

In operations in which the delivery sequence from each chute 208 is not assured, the control system 216 can re-identify each item prior to sorting and palletizing. In such cases, for example, each chute 208 can include a ring scanner.

In various embodiments, a machine vision system on each chute 208 can be used to maintain the association of destination information read at the reader 204 with individual parcels 220 being sorted and palletized by either human operators or robots.

Each carousel 214 can include an indicator under the control of the control system 216. The control system 216 can illuminate the indicator to signal to the operator which carousel should receive the current parcel 220, as identified by sequence, reidentification, or machine vision.

When a pallet is full, the carousel 214 indexes the filled pallet 212 to the pallet access portals 232 for that carousel 214, at which that pallet can be extracted. Pallet transport and management system 240 can load the pallet extracted from the carousel, replace an empty pallet, shrink-wrap the pallet, label the pallet, and perform other functions. Pallet transport and management system 240 can include one or more mobile transporters, whether as free-moving robots or track-mounted devices, that transport and process the pallets as described herein.

Various embodiments may retain more pallets than would otherwise be required as sorting destinations so that when a first destination pallet becomes full, a second, unallocated pallet elsewhere in the system can be assigned to subsequent items by control system 216 to the same sorting destination, so that sorting may continue while the pallet is replaced. In this scenario, the replaced pallet is initially unassigned, and the physical sorting layout into pallets of sorting system 200 continuously changes as pallets fill. A similar technique can be used for storage units as described below.

In particular, a control system 216 of sorting system 200 can control the carousels 214 so that the that begin indexing as soon as the parcels have been identified and assigned to a destination pallet 212, prior to parcels arriving at the chute 208, which significantly increases productivity. Further, productivity is also improved by automated shrink-wrapping and pallet handling performed by pallet transport and management system 240.

Some embodiments can include one or more sensors that enable control system 216 to determine that a parcel 220 has been moved from chute 208 to its destination pallet 212. When the control system 216 determines that a parcel 220 has been successfully moved from chute 208 to its destination pallet 212, it knows that it can begin indexing the next destination pallet 212 on that carousel 214 for the next package being sorted to that carousel. That is, until a particular parcel 220 has been moved from chute 208 to its destination pallet 212, the carousel 214 associated with that destination pallet 212 should not be operated to move the destination pallet 212 away from parcel access portal 230 (or otherwise in position to receive the parcel 220).

Various embodiments can include, for example, a sensor 250 on one or more of the chutes 208 that detects the presence of a parcel 220. Using sensor 250, the control system 216 can determine when a parcel 220 arrives at that chute 208 and when that parcel 220 is removed from that chute 208. Control system 216 can use this information to determine that parcels 220 are being properly transported and delivered and to determine when a parcel carousel should or should not be moved.

Alternately or additionally, various embodiments can include, for example, a sensor 252 on one or more of the destination pallet 212 or on the carousel 214 at locations corresponding to destination pallets 212 that detects the presence of a parcel 220. Using sensor 252, the control system 216 can determine when a parcel 220 has been properly placed on a destination pallet 212. Control system 216 can use this information to determine that parcels 220 are being properly transported and delivered and to determine when a parcel carousel should or should not be moved.

Sensors 250 and 252 can be implemented using any appropriate sensors, such as a physical switch, a vision sensor, a weight sensor, a photosensor, or otherwise.

Depending on the distribution of the parcels 220 being sorted, the throughput of the sorter system 200, and the speed with which carousels 214 are indexed/operated, the parcel sorter 220 may exceed the palletizing rate at individual positions or output chutes 208. This can be addressed in various ways in specific implementations. For example, various implementations can increase the ratio of carousels 214 per chute 208.

Some implementations can provide an accumulation at each chute 208, preferably maintaining the sequence of parcels 220, and require scanning each parcel 220 prior to palletizing. An indicator or display can be used to indicate the correct carousel, based on the scanning result, in implementations that use human operators to move parcels 220 from the chutes 208 to the destination pallets 212.

Various implementations can increase the number of chutes 208 per carousel 214, so that the sequence of parcels 220 to optimize the prepositioning of the carousel 214 is always maintained. For example, instead of one chute 208 per two carousels 214, an implementation may use six chutes 208 for two carousels 214. Such an implementation can use indicators or displays to communicate which carousel 214 is the destination for the current parcel 220 in a given chute 208. Control system 214 can then use these features to automatically optimize the indicated chute 208 among the six according to highest pre-indexing rate.

While the example above is specifically described using pallets, other embodiments can use other destination containers in place of the pallet in a sorting system as described herein. The destination container can be, for example, a sack, bin, box, shelf, bucket, or any other container that can be mounted to the carousel as described herein and into or onto which the parcels can be placed. The destination containers can include identifiers and sensors as described herein for pallets or storage units.

Figure 3:
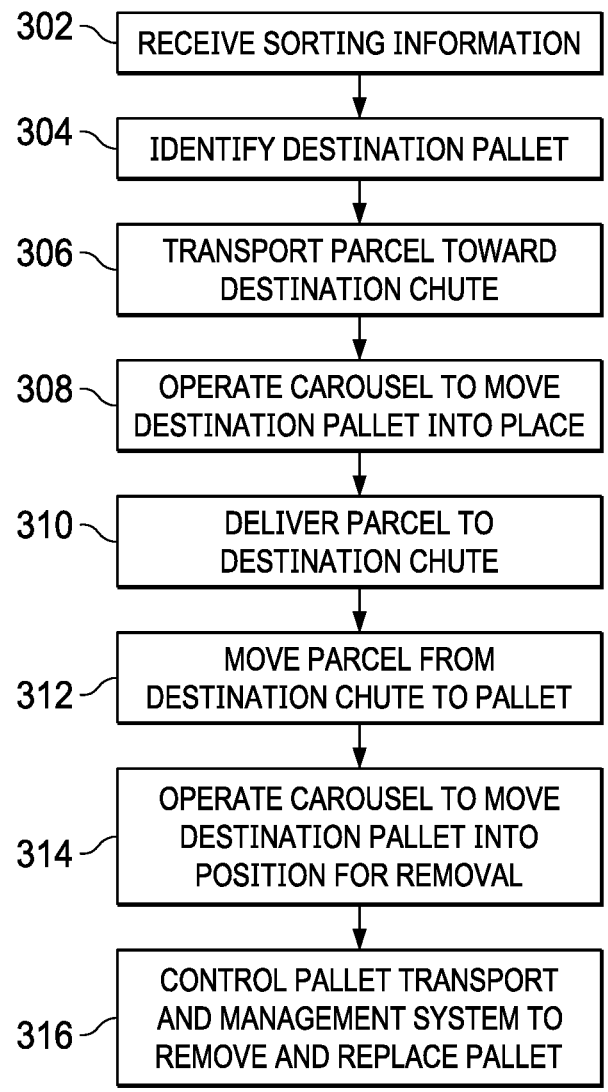
FIG. 3 illustrates a flowchart of a process in accordance with disclosed embodiments.

FIG. 3 illustrates a flowchart of a process in accordance with disclosed embodiments. The process of FIG. 3 can be implemented by using any of the features, components, or devices discussed herein, or any combination of them. The process of FIG. 3 is performed, for example, by a parcel sorter system as disclosed herein, and under the control of its control system.

The parcel sorter system receives sorting information for a first parcel (302). The sorting information can be, for example, a delivery destination for the first parcel, whether the ultimate delivery destination or an interim destination such as a local or regional postal office. "Receiving" data, as used herein, can include loading from storage, receiving from another device or process, or otherwise. In specific embodiments, however, the parcel sorter system receives the sorting information by using a reader 204 to detect indicia on the first parcel, such as parcel 220A, and can include performing an optical character recognition process on the indicia, performing a barcode recognition process on the indicia, and otherwise. As part of this step, the reader 204 or parcel sorter system 200 can also determine physical characteristics of the first parcel 220A, such as dimensions and weight.

The parcel sorter system identifies a first destination pallet or destination bin on a modular transportable storage unit corresponding to the sorting information (304). The first destination pallet or bin is associated with a first carousel and a first destination chute. In this example, consider that the parcel sorter system identifies destination pallet 212A as corresponding to the sorting information for parcel 220A. Destination pallet 212A is associated with carousel 214A (on which it is placed/transported) and destination chute 208A (which is proximate to carousel 214A).

The parcel sorter system transports the first parcel toward the first destination chute (306).

While the parcel sorter system is transporting the parcel toward the first destination chute, the parcel sorter system operates the first carousel to move the first destination pallet proximate to the first destination chute (308). As described herein, this can be operating the first carousel to move the first destination pallet to the parcel access portal 230 of carousel 214A.

The parcel sorter system delivers the first parcel at the first destination chute for placement on the first pallet (310). The first parcel should preferably be delivered to the first destination chute at the same time as or after the first destination pallet arrives proximate to the first destination chute (or at the parcel access portal 230) so that there is no delay of being able to move the first parcel from the first destination chute to the first pallet.

In some embodiments, the parcel sorter system moves the first parcel from the first destination chute to the first pallet (312), such as by using a palletizing robot, conveyor, or other mechanical means. In other cases, a human operator can move the first parcel from the first destination chute to the first pallet.

The parcel sorter system can operate the first carousel to move the first destination pallet into position to be removed from the first carousel (314). This process can include determining that the first pallet is filled. This process can include operating the first carousel to move the first destination pallet to a pallet access portal 232 of the first carousel.

The parcel sorter system can control a pallet transport and management system to remove and replace the first pallet (316). This can include removing the first pallet from the first carousel. This can include placing an empty pallet on the first carousel in place of the removed first pallet. This can include shrink-wrapping or otherwise packaging the first pallet for transport. This can include transporting the first pallet away from the first carousel for further processing.

Other embodiments address techniques for sorting parcels for direct delivery on a delivery vehicle, rather than palletizing them as described above, using similar sortation techniques. For a single delivery vehicle, the items preloaded represent the geographical area covered by the delivery route. The preloading of parcels prior to delivery represents the final steps of processing for the items being delivered. Parcels being processed within a processing center encompass a very broad range of destinations, including those destined for other countries, states, and municipalities, as well as those that will be delivered in the immediate regional area served by the processing center. Delivery vehicles are executing their routes during the course of the processing day, so items that will be subject to local delivery the following day must be accumulated at the facility over the course of the day in preparation for the preload the next morning.

Figure 4:
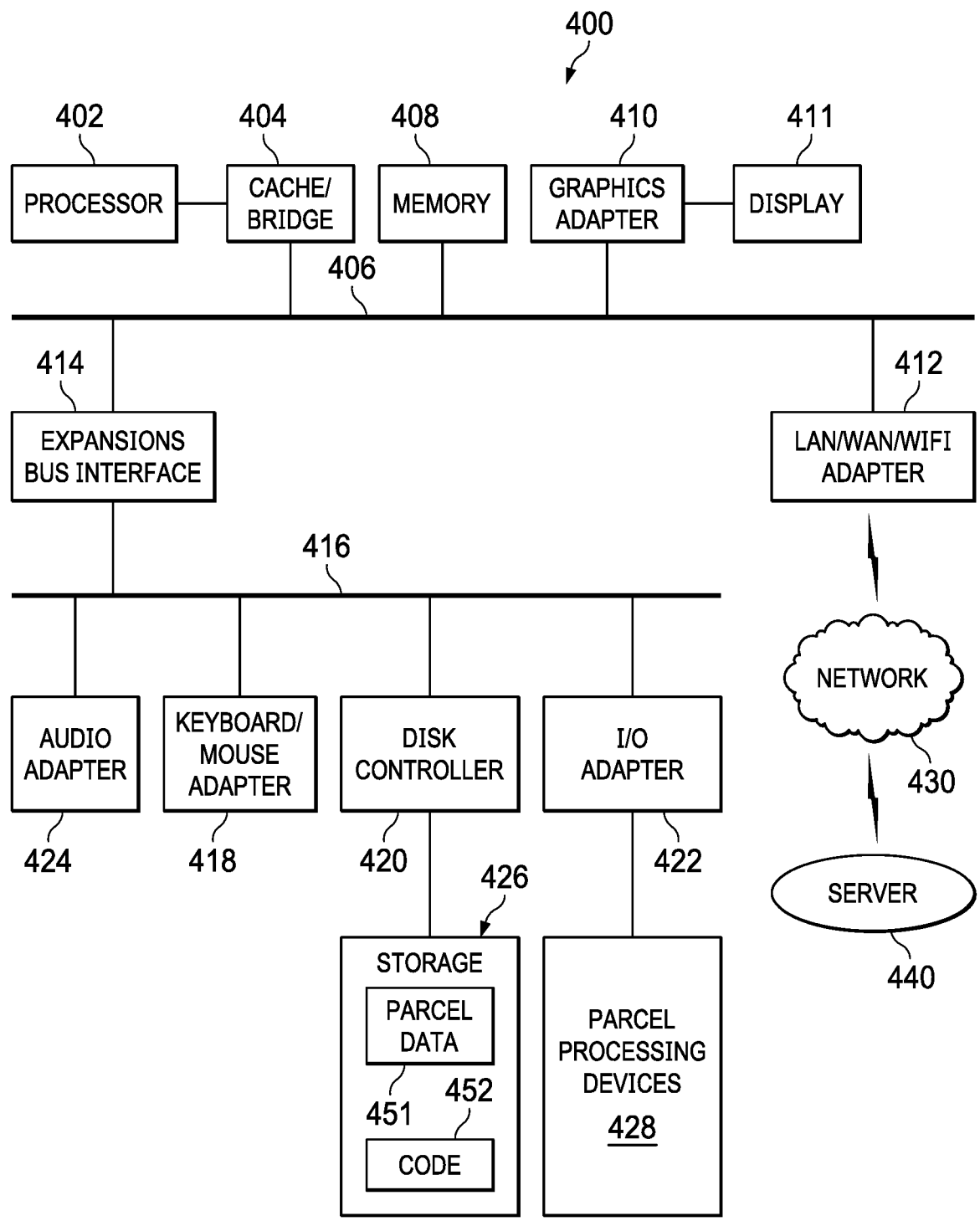
FIG. 4 depicts a block diagram of a data processing system in which an embodiment can be implemented.

FIG. 4 depicts a block diagram of a data processing system 400 in which an embodiment can be implemented, for example as a control system for parcel sorter system as described herein and can be configured to perform processes as described herein, such as in control system 216. The data processing system depicted includes a processor 402 connected to a level two cache/bridge 404, which is connected in turn to a local system bus 406. Local system bus 406 may be, for example, a peripheral component interconnect (PCI) architecture bus. Also connected to local system bus in the depicted example are a main memory 408 and a graphics adapter 410. The graphics adapter 410 may be connected to display 411.

Other peripherals, such as local area network (LAN)/Wide Area Network/Wireless (e.g. WiFi) adapter 412, may also be connected to local system bus 406. Expansion bus interface 414 connects local system bus 406 to input/output (I/O) bus 416. I/O bus 416 is connected to keyboard/mouse adapter 418, disk controller 420, and I/O adapter 422. Disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Storage 426 can store any data and code useful for performing processes as described herein. For example, storage 426 can store parcel data 451, which can include any parcel data, parcel information, address and destination data, sorting data, associations between parcels, destinations, chutes, pallets, carousels, storage units, and other elements, user inputs, device commands, or other data used for the monitoring and control of the parcel sorter system. Storage 426 can also store, as another example, executable code 452 that, when executed, causes processes as described herein to be performed.

I/O adapter 422 can be connected to parcel processing devices 428, as described herein, to which can include any hardware elements used to perform processes in accordance with the various embodiments described herein, including but not limited to sensors, conveyors, user input devices, display devices, indicators, conveyors, transporters, robots, parcel transport and management systems, etc.

Also connected to I/O bus 416 in the example shown is audio adapter 424, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 412 can be connected to a network 430 (not a part of data processing system 400), which can be any public or private data processing system network or combination of networks, as known to those of skill in the art, including the Internet. LAN/WAN/Wireless adapter 412 can also communicate with other devices or systems as described herein or as known for use in parcel processing or monitoring, and perform other data processing system or server processes described herein. Data processing system 400 can communicate over network 430 with one or more server systems 440, which are also not part of data processing system 400, but can be implemented, for example, as separate data processing systems 400. A server system 440 can be, for example, a central server or facility management system at a processing facility.

The exemplary data processing system 400 can also be used to implement an operator console or facility management system as described herein.

A sorter system as used herein can also be used for sorting parcels directly to vehicle-delivery order, using modular storage units that is are configured to be mounted into delivery vehicles.

In a typical process, during preload, the trailers or other large containers are filled with parcels for delivery and are manually unloaded to conveyors that extend past delivery vehicles associated with relevant delivery routes. Loader operators are tasked with loading several vehicles, and manually identify parcels to be loaded into each vehicle from parcels passing on the adjacent conveyor. Individual parcels are manually identified, manually taken inside the appropriate delivery vehicle, and positioned in the specific place to which they have been allocated within the vehicle.

For a single delivery vehicle, the items preloaded represent the geographical area covered by the delivery route. The preloading of parcels prior to delivery represents the final steps of processing for the items being delivered. Parcels being processed within a processing center encompass a very broad range of destinations, including those destined for other countries, states, and municipalities, as well as those that will be delivered in the immediate regional area served by the processing center. Delivery vehicles execute their routes during the course of the processing day, so items that will be subject to local delivery the following day must be accumulated at the facility over the course of the day in preparation for the preload the next morning.

The overall sorting process within a single facility that ends with the preload into delivery vehicles represents a hierarchical structure of elements, in which the first level represents the trailer or container, the second represents the vehicles, and the third represents the position within the vehicle. Only the sort to the trailer is likely to be automated, and the rest suffer from the low productivity and high error rate of manual sorting. The total number of sorting bins required is the number of vehicle storage positions (for example, 36) times the number of vehicles (for example, 220), for 7,920 bins, which far exceeds the limits of typical sorting technology.

Disclosed embodiments can use a carousel sorting system as described above, replacing the pallets with modular transportable storage units.

FIG. 5 illustrates one non-limiting example of a modular transportable storage unit 500 that can be used in a sortation system as described herein. In this example, storage unit 500 includes multiple shelves/bins 502, in a multi-layered configuration. In this example, each shelf/layer/tier includes two bins 502 configured to receive and store parcels for delivery. Storage unit 500 includes wheels 504 and can include mounting hardware 506. Mounting hardware 506 can be configured to mount the storage unit 500 onto a carousel as described herein, to mount the storage unit 500 on a take-away/transport system, and to mount the storage unit 500 into a delivery vehicle. While mounting hardware 506 is illustrated in this example as simple mounting brackets, any type of mounting hardware can be used, including brackets, clamps, hooks, loops, straps, and others. As illustrated in this example, each bin 502 is slanted so that parcels are retained in the bin 502. In some implementations, storage unit 500 can be mounted so that the lower end of each bin is against a sidewall of a sorter/transport device or the sidewall of the delivery vehicle.

As illustrated in FIG. 5, each storage unit 500 has multiple tiers of bins 502, and each shelf/layer/tier includes multiple bins 502 configured to receive and store parcels for delivery. While this example shows four tiers with two bins each, different implementations can use any number of tiers/shelves and any number of bins per tier/shelf, and the number of bins on each shelf can be the same or different.

Conventional parcel delivery vehicles have divided, slanted shelves on each wall that must be manually loaded as described above. The storage unit 500 as disclosed herein can be configured to be transported into such a delivery vehicle and mounted to the sidewalls of the cargo area, replacing the conventional shelves with bins 502. Bins 502 can be approximately the same size, shape, and configuration as the conventional shelves, and so function as multiple tiers of angled shelving. Multiple storage units 500 can be mounted in a single vehicle to completely occupy the sidewalls. That is, for example, if the cargo sidewall of a delivery vehicle is 12 feet long, then two 6-foot-wide storage units 500 or three 4-foot-wide storage units 500 can be mounted on that sidewall in place of the conventional shelves.

By using a storage unit 500 in place of pallets on the carousels described herein, the number of sort destinations at each carousel location is multiplied by the number of bins 502 on the storage unit 500 at that carousel location, as described in more detail below.

In various embodiments, each modular transportable storage unit 500 can be securely mounted in the delivery vehicle to prevent shifting during transportation, including potential traffic accidents or even roll-overs. Although the existing shelving that is installed in delivery vehicles does not have means to retain items on the shelves, various embodiments can include a means for restraining the parcels in bins 502, such as elastic netting on one or both sides of the bins. Such restraint means are preferably easily retractable or removable when the vehicle is stopped, so that parcels can be easily retrieved by the operator at the delivery point but are restrained during transit.

Each bin 502 can correlate to existing designated loading positions for the items to be delivered on the route. The storage unit 500 itself can also represent a known position within the delivery vehicle, such that when all of the storage units are transferred to the delivery vehicle and positioned according to the prescribed location, the position of every item to be delivered finds itself at the ideal location to accommodate the sequence of deliveries, according to the methodology preferred by the delivery service company. For instance, the prescribed sequence of deliveries according to the route may manifest in the items being delivered from front to back, from top to bottom, etc. Since, as disclosed herein, the storage units 500 are directly loaded at the sorter system, the control system can control the sortation process to the storage units 500 according to a delivery sequence defined by the delivery service company.

The storage unit 500 can include one or more sensors 508, such as sensor 252 described above. For example, each bin 502 can have a sensor 508.

The storage unit 500 can include one or more identification device 510. Identification device 510 can be a machine-readable identifier that identifies the particular storage unit 500 and can be used by the control system to track the storage unit and parcels associated with the storage unit. Similarly, identification device 510 can be used by a system in a warehouse, on a dock, on a transport system, or in the delivery vehicle itself to track the storage unit and parcels associated with the storage unit, to direct the loading of the storage unit 500 into a specific vehicle, and to verify that a vehicle has only been loaded with the correct storage units 500. This can enable precise tracking of parcel delivery location and status without requiring a re-scan of a parcel as it is loaded into a vehicle. Identification device 510 can be, for example, a machine-readable bar code, including 2D and 3D bar codes, a radio-frequency identification (RFID) tag, a Bluetooth-readable tag, or other machine-readable or detectable identification device. Identification device 510 can include encryption or other security features usable for ensuring that storage unit 500 is authentic and authorized, to prevent unauthorized storage units from being inserted in the parcel processing operations.

Figure 6:
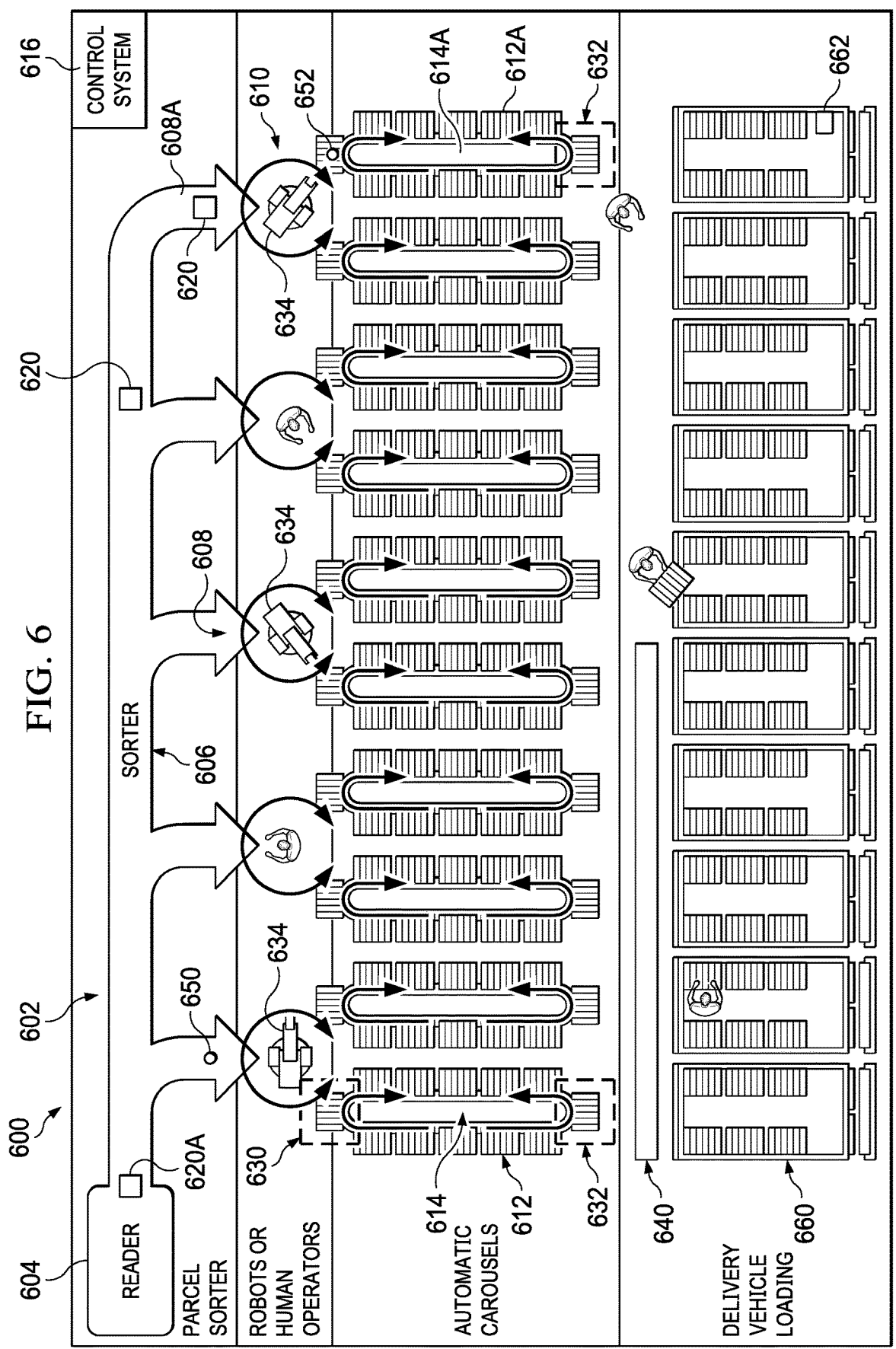
FIG. 6 illustrates an example of another sorting system in accordance with disclosed embodiments.

FIG. 6 illustrates an example of a sorting system 600 in accordance with disclosed embodiments, which improves on a system as illustrated in FIG. 1. A sorting system 600 as disclosed herein radically improves the productivity of the second step in sorting and in the preparation of parcels for delivery by enabling pre-loading of storage units as described herein. Sorting system 600 and its various elements described herein operated under the control of a control system 616, which can be a standalone control system, a control system that also controls other devices or systems, a combination of interconnected control systems that are integrated with one or more of the components described here, or otherwise. Control system 616 is configured to control the various elements of sorting system 600 to perform actions as described herein.

In the example of FIG. 6, the sorting system 600 includes a parcel sorter 602 which itself includes a parcel reader 604, sorter mechanism 606, and destination chutes 608 (which may also be referred to herein as destination "buckets"). Parcel reader 604 determines the destination of parcels 620 on sorter mechanism 606. In the example of FIG. 5, five chutes 608 are shown on the parcel sorter 602, for simplicity of illustration, though an actual implementation may have more or even many more chutes 608.

Proximate to the output of each chute 608 is one or more parcel carousels 614, each carrying a plurality of storage units 612, which can be implemented, for example as a storage unit 500. In this non-limiting example, there are two carousels 614 proximate to the output of each chute 608, twelve storage units 612 carried by each carousel 614, and each storage unit 612 is shows as having five bins (in the top tier of each storage unit 612). As described above, each storage unit 612 can have multiple tiers of bins, and each shelf/layer/tier includes multiple bins configured to receive and store parcels for delivery, though this top-town view does not show the multiple tiers. At 610, human operators, robots 634, or other transport mechanisms transport individual parcels 620 from each destination chute 608 onto a specific bin on a specific storage unit 612 on a carousel 614, such as "second bin, third tier" on a specific storage unit.

The sorting-destination result from the reader 604 for each parcel 620 is known well before the parcel 620 reaches its destination chute 608 on the sorter mechanism 606. In the hierarchy of sorting illustrated in FIG. 6, the ultimate number of sorting destinations is represented by the number of bins on the number of storage units 612 in all of the carousels 614. In this example, each carousel 614 holds twelve storage units 612. Using the example of FIG. 5, assume that each storage unit 612 has eight bins (2 bins on each of four tiers). There are ten carousels 614, therefore the total number of buckets (sorting destinations) is 12×8×10=960. This is a significant increase in the number of discrete sorting destinations over other approaches and enables pre-sorting and pre-loading the delivery vehicles 660, using these modular transportable storage units, for a sorting and delivery process that is much more efficient and accurate than current approaches.

In this example, each carousel 614 can include (but is not required to have) at least two access portals. A parcel access portal 630 is configured so that parcels 620 may be placed (or removed) onto individual storage units 612 on the carousel 614, whether by an operator or by automation by the sorting system 600 itself using a robot, conveyor system, or otherwise. A storage unit access portal 632 is configured so that individual storage units 612 can be inserted and extracted from the carousel 614. In the example of FIG. 6, storage unit access portal 630 is located at the end of each carousel 614 nearest to the respective destination chute 608, while storage unit access portal 632 is located at the end of each carousel 614 furthest from the respective destination chute 608.

In various embodiments, a storage unit transport and management system 640 can be configured to travel between the multiple storage unit access portals 632, and can be configured to manage the storage units 612, performing such tasks as removing filled storage units 612 from the carousel 614, shrink-wrapping or otherwise preparing filled storage units 612 for transport (if necessary or useful), transporting filled storage units 612 to further processing stages or directly to a correct placement on a vehicle loading dock, transporting empty storage units 612 to the carousels 614, and placing empty storage units 612 into the carousel 614. In other cases, carousels 614 can deliver storage units 612 directly to an area proximate to delivery vehicles 660 for easy and convenient transport and mounting in the delivery vehicles 660.

The capacity of each carousel 614 depends on the individual design. Indeed, since the maximum carousel index time is ideally less than the latency time between the reader 604 and the destination chute 608, it may advantageous to implement shorter carousels or carousels with fewer sorting destinations at the chutes 608 nearer to the reader 604. As shown above, carousels are bidirectional; the direction providing shortest index time between the current position and the next position is preferably selected.

For each of the parcels that have passed the reader 604 (apart from unreadable parcels), the particular storage unit 612 sorting destination is determined and known by the control system 616 so that actions can be taken across the entire sorting system 600. This allows the allows the control system 616 to begin moving ("indexing") the carousels 614 containing the destination storage unit 612 for each parcel 620 to the correct position prior to the parcel being sorted. This feature increases the sorting productivity, particularly but not limited to when human operators are used by reducing or eliminating any "waiting time" between when a sorted parcel is delivered from chute 608 and when the sorting destination storage unit 612 is moved to the storage unit access portal 630 (or otherwise in position to receive the parcel 620). Since the distance from the reader 604 to the destination chute 608 translates to the amount of carousel indexing head-start, the density destinations may be shifted to the longer-distance chutes. In some cases, the system can assign a destination layout so that the shortest distance between the reader and any chute provides adequate latency for the longest carousel indexing time.

In different embodiments, depending on various factors, including the physical characteristics of the parcels being processed, it may be advantageous to utilize either robots or human operators to perform the sorting and placement function, as illustrated at 610. In the illustration above, the operator or robot is responsible for placing sorted items onto one of two storage units 612, depending on various factors of performance and layout, this relationship could be one to four, one to six, or more. Further, as illustrated, any particular position for given parcel carousels can be assigned to a human operator, robot 634, or another transport mechanism, and so there may be a combination of these in any particular implementation.

Various embodiments can include specific design elements that reduce or prevent mis-sorting. For example, each chute 608 can be implemented with a "chevron" orientation of rollers on a gravity conveyor maintain the sequence of the items sorted to that chute and a single-file sequence of items.

In operations in which the delivery sequence from each chute 608 is not assured, the control system 616 can re-identify each item prior to sorting and loading the storage units 612. In such cases, for example, each chute 608 can include a ring scanner.

In various embodiments, a machine vision system on each chute 608 can be used to maintain the association of destination information read at the reader 604 with individual parcels 620 being sorted and loaded into the storage units 612 by either human operators or robots.

Each carousel 614 can include an indicator under the control of the control system 616. The control system 616 can illuminate the indicator to signal to the operator which carousel and bin should receive the current parcel 620, as identified by sequence, reidentification, or machine vision. The indicator can be implemented using a computer display, a set of indicator lamps, or otherwise.

Where robots 634, conveyors, or other automation is used to move parcels into bins on the storage units 612, the robots 634, conveyors, or other automation are configured to be able to deliver parcels to any of the specific bins in each tier of the storage units 612.

When a storage unit 612 is full, the carousel 614 indexes the filled storage unit 612 to the storage unit access portals 632 for that carousel 614, at which that storage unit can be extracted. Storage unit transport and management system 640 can load the storage unit extracted from the carousel, replace an empty storage unit, transfer the storage unit (if needed), read the identification device 510, and perform other functions. Storage unit transport and management system 640 can include one or more mobile transporters, whether as free-moving robots or track-mounted devices, that transport and process the storage units as described herein.

In particular, a control system 616 of sorting system 600 can control the carousels 614 so that the that begin indexing as soon as the parcels have been identified and assigned to a destination storage unit 612, prior to parcels arriving at the chute 608, which significantly increases productivity. Further, productivity is also improved by automated identification and storage unit handling performed by storage unit transport and management system 640.

Some embodiments can include one or more sensors that enable control system 616 to determine that a parcel 620 has been moved from chute 608 to its destination storage unit 612. When the control system 616 determines that a parcel 620 has been successfully moved from chute 608 to its destination storage unit 612, it knows that it can begin indexing the next destination storage unit 612 on that carousel 614 for the next package being sorted to that carousel. That is, until a particular parcel 620 has been moved from chute 608 to its destination storage unit 612, the carousel 614 associated with that destination storage unit 612 should not be operated to move the destination storage unit 612 away from parcel access portal 630 (or otherwise in position to receive the parcel 620).

Various embodiments can include, for example, a sensor 650 on one or more of the chutes 608 that detects the presence of a parcel 620. Using sensor 650, the control system 616 can determine when a parcel 620 arrives at that chute 608 and when that parcel 620 is removed from that chute 608. Control system 616 can use this information to determine that parcels 620 are being properly transported and delivered and to determine when a parcel carousel should or should not be moved.

Alternately or additionally, various embodiments can include, for example, a sensor 652 on one or more of the destination storage unit 612 (such as a sensor 508) or on the carousel 614 at locations corresponding to destination storage unit 612 that detects the presence of a parcel 620. Using sensor 652, the control system 616 can determine when a parcel 620 has been properly placed on a destination storage unit 612. Control system 616 can use this information to determine that parcels 620 are being properly transported and delivered and to determine when a parcel carousel should or should not be moved.

Sensors 650 and 652 can be implemented using any appropriate sensors, such as a physical switch, a vision sensor, a weight sensor, a photosensor, or otherwise.

Depending on the distribution of the parcels 620 being sorted, the throughput of the sorter system 600, and the speed with which carousels 614 are indexed/operated, the parcel sorter 620 may exceed the processing rate at individual positions or output chutes 608. This can be addressed in various ways in specific implementations. For example, various implementations can increase the ratio of carousels 614 per chute 608.

Some implementations can provide an accumulation at each chute 608, preferably maintaining the sequence of parcels 620, and require scanning each parcel 620 prior to transport to the storage units 612. An indicator or display can be used to indicate the correct carousel, based on the scanning result, in implementations that use human operators to move parcels 620 from the chutes 608 to the destination storage units 612.

Various implementations can increase the number of chutes 608 per carousel 614, so that the sequence of parcels 620 to optimize the prepositioning of the carousel 614 is always maintained. For example, instead of one chute 608 per two carousels 614, an implementation may use six chutes 608 for two carousels 614. Such an implementation can use indicators or displays to communicate which carousel 614 is the destination for the current parcel 620 in a given chute 608. Control system 614 can then use these features to automatically optimize the indicated chute 608 among the six according to highest pre-indexing rate.

As described above and in some embodiments, during sorting, modular transportable storage units 612 are loaded into an automatic horizontal carousel 614. During sortation, each modular transportable storage unit 612 represents multiple sorting destinations, such as one destination per shelf or bin. Each parcel can undergo three or more levels of sortation in the process, in which an automatic sorter is sorting to a chute serving number of carousels, carousels are automatically indexing to present the next modular transport unit involved in sorting, an operator or robot is directing a parcel from the chute to the relevant carousel, and each parcel is then placed in the designated bin within the modular transportable storage unit 612. The modular transportable storage units 612 can then be moved to and mounted in a vehicle 660 in a pre-determined location in the vehicle 660 according to, for example, the delivery order of the parcels on that storage unit 612. As described herein, each vehicle 660 can have a sensor 662 configured to read the identification device 510 to determine or verify that the correct storage units 612 are loaded into the respective vehicles.

Figure 7:
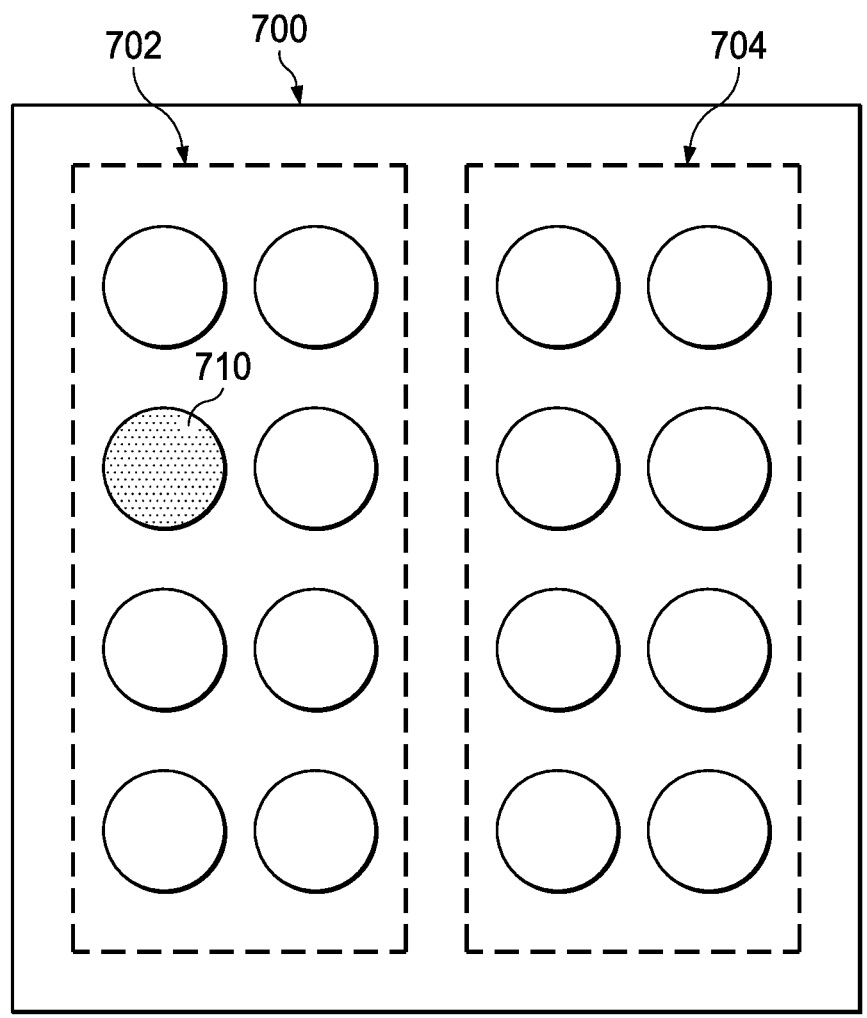
FIG. 7 illustrates an example of a sorting system indicator in accordance with disclosed embodiments.

FIG. 7 illustrates an example of an indicator 700, as described herein, under the control of the control system 616. In this example, the indicator 700 comprises a plurality of indicator lamps (such as LEDs or others), in banks that represent storage units 612 on two different carousels 614. For example, such an indicator 700 can be placed proximate to a chute 608 that serves two carousels 614, where bank 702 represents the left carousel 614 with respect to the chute 608 and the operator's perspective, and bank 704 represents the right carousel 614 with respect to the chute 608 and the operator's perspective. The control system 616 can illuminate the a specific indicator lamp of the indicator 700 to signal to the operator which carousel and bin should receive the current parcel 620, as identified by sequence, reidentification, or machine vision. In this example, indicator lamp 710 is activated, signaling to the operator that the next parcel in the chute 608 should be placed in the storage unit on the left carousel, in the left bin on the third tier from the bottom. Of course, the implementation and layout of the indicator lamps can be customized to the actual capacity and configuration of the storage units 612.

Figure 8:
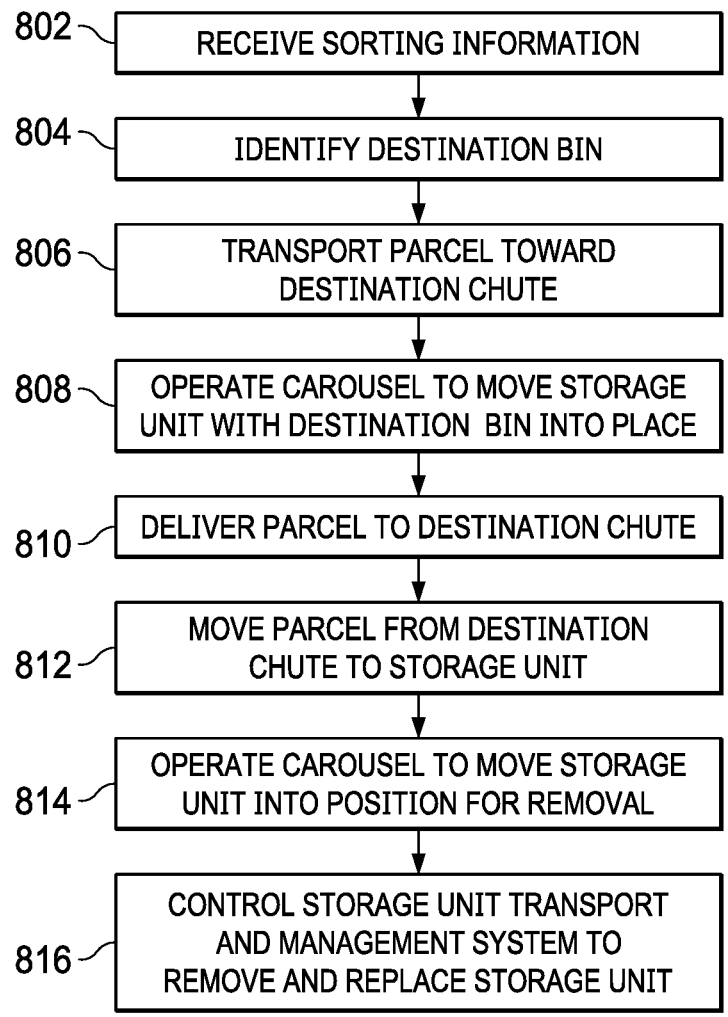
FIG. 8 illustrates a flowchart of another process in accordance with disclosed embodiments.

FIG. 8 illustrates a flowchart of a process in accordance with disclosed embodiments. The process of FIG. 8 can be implemented by using any of the features, components, or devices discussed herein, or any combination of them. The process of FIG. 8 is performed, for example, by a parcel sorter system as disclosed herein, and under the control of its control system.

The parcel sorter system receives sorting information for a first parcel (802). The sorting information can be, for example, a delivery destination for the first parcel, whether the ultimate delivery destination or an interim destination such as a local or regional postal office. "Receiving" data, as used herein, can include loading from storage, receiving from another device or process, or otherwise. In specific embodiments, however, the parcel sorter system receives the sorting information by using a reader 604 to detect indicia on the first parcel, such as parcel 620A, and can include performing an optical character recognition process on the indicia, performing a barcode recognition process on the indicia, and otherwise. As part of this step, the reader 604 or parcel sorter system 600 can also determine physical characteristics of the first parcel 620A, such as dimensions and weight.

The parcel sorter system identifies a first destination bin on a modular transportable storage unit 612 corresponding to the sorting information (804). The first destination bin is associated with a first carousel and a first destination chute. In this example, consider that the parcel sorter system identifies destination bin 612A as corresponding to the sorting information for parcel 620A. Destination bin 612A is associated with carousel 614A (on which it is placed/transported) and destination chute 608A (which is proximate to carousel 614A).

The parcel sorter system transports the first parcel toward the first destination chute (806).

While the parcel sorter system is transporting the parcel toward the first destination chute, the parcel sorter system operates the first carousel to move the storage unit with the first destination bin proximate to the first destination chute (808). As described herein, this can be operating the first carousel to move the storage unit 612 with the first destination bin 612A to the parcel access portal 630 of carousel 614A.

The parcel sorter system delivers the first parcel at the first destination chute for placement in the first destination bin (810). The first parcel should preferably be delivered to the first destination chute at the same time as or after the storage unit with the first destination bin arrives proximate to the first destination chute (or at the parcel access portal 630) so that there is no delay of being able to move the first parcel from the first destination chute to the first destination bin.

In some embodiments, the parcel sorter system moves the first parcel from the first destination chute to the first destination bin (812), such as by using a robot, conveyor, or other mechanical means. In other cases, a human operator can move the first parcel from the first destination chute to the first destination bin.

The parcel sorter system can operate the first carousel to move the storage unit with the first destination bin into position to be removed from the first carousel (814). This process can include determining that the first storage unit is filled or that no more parcels are to be delivered to the destinations corresponding to that storage unit. This process can include operating the first carousel to move the storage unit with the first destination bin to a storage unit access portal 632 of the first carousel. This process can include operating the first carousel to move the storage unit with the first destination bin to a location proximate to a vehicle or vehicle loading dock.

The parcel sorter system can control a storage unit transport and management system to remove and replace the storage unit with the first destination bin (816). This can include removing the storage unit from the first carousel. This can include placing an empty storage unit on the first carousel in place of the removed first storage unit. This can include shrink-wrapping or otherwise preparing the first storage unit for loading and transport. This can include transporting the first storage unit away from the first carousel for further processing, including transporting the first storage unit to a position proximate to a delivery vehicle or loading dock.

Subsequently, the storage unit can be transported to and mounted into a delivery vehicle corresponding to the delivery destination. A reader or sensor on the delivery vehicle can determine or verify that the correct storage unit has been loaded in to the correct delivery vehicle, and a system on the delivery vehicle can communicate this information wirelessly to the control system to facilitate tracking of each of the parcels.

Other embodiments address techniques for sorting parcels for direct delivery on a delivery vehicle, rather than palletizing them as described above, using similar sortation techniques. For a single delivery vehicle, the items preloaded can represent the geographical area covered by the delivery route. The preloading of parcels prior to delivery represents the final steps of processing for the items being delivered. Parcels being processed within a processing center encompass a very broad range of destinations, including those destined for other countries, states, and municipalities, as well as those that will be delivered in the immediate regional area served by the processing center. Delivery vehicles are executing their routes during the course of the processing day, so items that will be subject to local delivery the following day must be accumulated at the facility over the course of the day in preparation for the preload the next morning.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein can be combined in any number of implementations.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A parcel sorter system, comprising:
   a control system;
   a parcel sorter under control of the control system;
   a plurality of destination chutes configured to receive parcels from the parcel sorter; and
   a plurality of carousels under control of the control system, each carousel transporting a plurality of pallets or containers, each pallet or container representing a different sorting destination,
   wherein the control system is configured to:
   receive sorting information of a first parcel;
   identify a first destination pallet or container of the plurality of pallets or containers corresponding to the sorting information, wherein the first destination pallet or container is associated with a first carousel of the plurality or carousels and a first destination chute of the plurality of destination chutes;
   transport the first parcel toward the first destination chute on the parcel sorter;
   while transporting the first parcel toward the first destination chute, operate the first carousel to move the first destination pallet or container proximate to the first destination chute; and
   deliver the first parcel at the first destination chute for placement on the first destination pallet or container,
   wherein the control system is configured, for each parcel, to begin moving a carousal containing a destination pallet or container for that parcel to a correct receiving position prior to that parcel being sorted.

2. The parcel sorter system of claim 1, wherein the control system is further configured to move the first parcel from the first destination chute to the first destination pallet or container.

3. The parcel sorter system of claim 1, wherein the control system is further configured to operate the first carousel to move the first destination pallet or container into position to be removed from the first carousel.

4. The parcel sorter system of claim 1, wherein the control system is further configured to control a transport and management system to remove and replace the first destination pallet or container.

5. The parcel sorter system of claim 1, wherein the first parcel is delivered to the first destination chute at the same time as or after the first destination pallet or container arrives proximate to the first destination chute.

6. A parcel sorter system, comprising:
   a control system;
   a parcel sorter under control of the control system;
   a plurality of destination chutes configured to receive parcels from the parcel sorter; and a plurality of carousels under control of the control system, each carousel transporting a plurality of modular transportable storage units, each storage unit having a plurality of bins, each bin representing a different sorting destination,
wherein the control system is configured to:
receive sorting information of a first parcel;
identify a first destination bin of the plurality of destination bins, on a first storage unit being transported by the first carousel, corresponding to the sorting information, wherein the first destination bin is associated with the first carousel of the plurality of carousels and a first destination chute of the plurality of destination chutes;
transport the first parcel toward the first destination chute on the parcel sorter;
while transporting the first parcel toward the first destination chute, operate the first carousel to move the first destination bin proximate to the first destination chute; and
deliver the first parcel at the first destination chute for placement in the first destination bin,
wherein the control system is configured, for each parcel, to begin moving a carousal containing a destination storage unit for that parcel to a correct receiving position prior to that parcel being sorted.

7. The parcel sorter system of claim 6, wherein the control system is further configured to move the first parcel from the first destination chute to the first destination bin.

8. The parcel sorter system of claim 6, wherein the control system is further configured to operate the first carousel to move the first storage unit into position to be removed from the first carousel.

9. The parcel sorter system of claim 6, wherein the control system is further configured to control a storage unit transport and management system to remove and replace the first storage unit.

10. The parcel sorter system of claim 6, wherein the first parcel is delivered to the first destination chute at the same time as or after the first destination bin arrives proximate to the first destination chute.

11. The parcel sorter system of claim 6, wherein the first storage unit comprises an identification device with a machine-readable identifier that identifies the first storage unit and is usable by the control system to track the first storage unit and parcels associated with the first storage unit or to verify that the first storage unit has been mounted into a delivery vehicle.

12. The parcel sorter system of claim 6, wherein the first storage unit comprises an identification device with a machine-readable identifier that identifies the first storage unit and is implemented using a machine-readable bar code, a radio-frequency identification (RFID) tag, or a wirelessly readable tag.

13. The parcel sorter system of claim 6, wherein the first storage unit comprises an identification device with a machine-readable identifier that identifies the first storage unit and is implemented using security features usable for ensuring that the first storage unit is authentic and authorized.

14. The parcel sorter system of claim 6, wherein the first storage unit is configured to be mounted directly into a delivery vehicle when loaded with parcels for delivery.

* * * * *